United States Patent Office 3,008,945
Patented Nov. 14, 1961

3,008,945
METHODS OF PREPARING 1,4 TRANS POLYISOPRENE
William M. Saltman, Akron, Ohio, assignor to The Goodyear Tire & Rubber Company, Akron, Ohio, a corporation of Ohio
No Drawing. Filed Apr. 28, 1958, Ser. No. 731,151
8 Claims. (Cl. 260—94.3)

This invention relates to methods of preparing polyisoprene from monomeric isoprene. More particularly it relates to methods of preparing addition polymers of isoprene in which the polymer structure is one of 1,4 addition and trans configuration. It also relates to a catalyst system useful to prepare such polymers.

Isoprene may be polymerized by addition polymerizations wherein the addition may take place through various carbon atoms resulting in several different polymer structures as illustrated below:

$$CH_2=C-CH=CH_2$$
$$|$$
$$CH_3$$

Isoprene monomer $$-CH_2-C=CH-CH_2-$$
$$|$$
$$CH_3$$

1,4 addition polymer unit

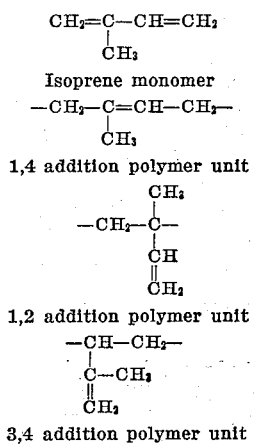

1,2 addition polymer unit $$-CH-CH_2-$$
$$|$$
$$C-CH_3$$
$$||$$
$$CH_2$$

3,4 addition polymer unit

The 1,4 addition polyisoprene polymer structure may exist in both cis and trans configurations as illustrated below:

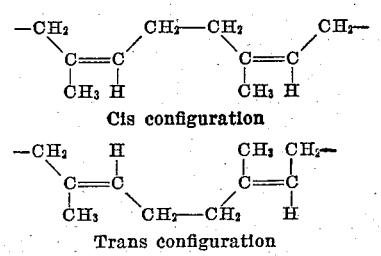

Cis configuration

Trans configuration

The 1,4 addition, cis configuration polyisoprene is known to be the structure of natural rubber, while the 1,4 addition trans configuration polyisoprene is known to be the structure of de-resinated natural balata.

It is an object of this invention to provide methods for polymerizing monomeric isoprene to form addition polymers having a polymer structure of 1,4 addition and trans configuration. It is a further object to provide a catalyst system for polymerizing isoprene in a regular or stereo-specific manner.

According to the invention, isoprene is polymerized to form 1,4 addition, trans configuration polyisoprenes in the presence of a catalyst comprising an aluminum alkyl, titanium tetrachloride and ferric chloride.

In general, isoprene is polymerized in the presence of the aforementioned catalyst system while the isoprene is dissolved in an inert solvent or diluent. The term inert solvent or diluent means that the solvent or diluent does not ented into the structure of the resulting polymer nor does it adversely affect the properties of the resulting polymer. The use of inert solvents or diluents provides a means of controlling the heat of reaction and thereby does affect the rate of polymerization. Usually the more inert solvent used the slower the rate of reaction, other things being equal. Examples of inert solvents or diluents useful in the practice of this invention are paraffinic hydrocarbons such as pentane, hexane and heptane and aromatic hydrocarbons such as benzene, toluene and the like. Of these benzene is preferred. The solvent/monomer ratio employed in the practice of this invention can be varied over comparatively wide limits, for instance from as low as 1 or 2:1 up to 20 or more:1. However, it is preferred to utilize a solvent/monomer ratio of approximately 3:1, this having been found to provide a satisfactory reaction rate consistent with economical use of solvent.

The temperature employed in the polymerization of monomeric isoprene may be varied broadly between a low temperature such as 0° C. up to a temperature of 90° C. or more. However, it is preferred to polymerize at a temperature of approximately 50° C.

As has been mentioned above, the catalyst which causes isoprene to polymerize in a stereo-specific manner to form an addition polymer having a polymer structure of 1,4 addition and a trans configuration comprises a ternary mixture of an aluminum alkyl, titanium tetrachloride and ferric chloride. The aluminum alkyl portion of this catalyst may be any alkyl radical such as aluminum triethyl, aluminum trihexyl, aluminum triheptyl, aluminum tripropyl, aluminum tripentyl, aluminum triisobutyl, aluminum trioctyl and the like. Of these, aluminum triisobutyl is preferred. The amount of aluminum alkyl required in the practice of this invention is from about 0.5 to 3.1 grams, calculated as aluminum triisobutyl, per 100 grams of monomeric isoprene. It is preferred to use the aluminum alkyl at about 1.9 grams, calculated as aluminum triisobutyl, per 100 grams of monomeric isoprene. The amount of titanium tetrachloride portion of the catalyst should be from 0.05 to 0.3 gram of titanium tetrachloride per 100 grams of monomeric isoprene. It is preferred to use 0.18 gram of titanium tetrachloride per 100 grams of monomeric isoprene. The amount of ferric chloride portion in the catalyst system should be from 0.19 to 0.9 gram of ferric chloride per 100 grams of monomeric isoprene. It is preferred to use 0.77 gram per 100 grams of monomeric isoprene. To form 1,4 addition trans configuration polyisoprene in accordance with this invention requires that the molar ratios of the three materials making up the catalyst system of this invention be adjusted so that the metal portions of each component be in the range of 6 or 10/1/1 to 7 of aluminum/titanium/iron.

The preferred molar ratio is 10/1/5 of Al/Ti/Fe. In other words, the molecular weight of the chlorides of titanium and iron remain constant while the molecular weight of the aluminum alkyl will vary with the particular alkyl employed, and allowance for this variable on a weight basis should be made to conform to the metal molar ratios recited.

This invention is further illustrated by the following examples in which all parts are reported by weight unless otherwise noted. The dilute solution viscosity (D.S.V.) of the polymers were all measured as 0.1% solutions of polymer by weight in benzene. These examples are intended to be merely illustrative and not restrictive of the scope of this invention.

EXAMPLE 1

Anhydrous C.P. grade ferric chloride in the amount of 0.1045 gram (0.64 millimole) was transferred to a weighing bottle in a dry nitrogen atmosphere. This anhydrous C.P. ferric chloride was then transferred quantitatively to a dry 4-ounce screw cap bottle equipped with a self-sealing gasket. Dry distilled benzene was used to transfer the last traces of the ferric chloride into the bottle. A total of 60 milliliters of benzene was used. The following materials were then charged in order into the bottle: a 4 milliliter portion of 0.323 molar solution of aluminum triisobutyl in dry distilled heptane, a 4 milliliter portion of 0.0323 molar solution of titanium tetrachloride in dry distilled heptane, a 20 milliliter portion of dry distilled isoprene. Care was taken to exclude moisture and air from this bottle. This bottle was rotated in a tumbling bath at 50° C. for a period of 65 hours at which time the contents were poured into an excess of isopropanol to destroy the catalyst and coagulate the polymer. This polymer was filtered and washed with isopropanol and dried under vacuum at room temperature for 48 hours. A 26.2% yield of rubber-like polymer was obtained. A portion of this dry rubber-like material was dissolved in benzene and a dilute solution viscosity of 4.26 was obtained on this polymer. Another portion of this rubber-like polymer was dissolved in carbon disulfide. A film evaporated from this solution was obtained and examined in accordance with standard infrared spectrometer techniques. Upon analysis of this film and the carbon disulfide solution by means of standard infrared spectra techniques, it was determined that the film was indistinguishable from de-resinated balata and the solution analysis gave 97% trans configuration 1,4 polyisoprene. An X-ray examination of the unstretched dry rubber-like polymer showed crystalline bands identical with that of balata. In physical appearance the polymer had the same tough fibrous nature of that of natural balata or gutta percha.

In this example the amounts of catalyst used correspond to an Al/Ti/Fe molar ratio of 10/1/5. The total amount of catalyst amounts to 2.8 parts by weight per 100 parts of monomer.

EXAMPLE 2

An experiment similar to that of Example 1 was performed except that 0.0571 gram of ferric chloride, 6.5 milliliters of aluminum triisobutyl and 6.5 milliliters of titanium tetrachloride of the same molarity solutions were used. This is equivalent to a molar ratio of Al/Ti/Fe of 10/1/1.6. A 7% yield of polymer with the same physical appearance as that obtained in Example 1 was obtained. This polymer had a dilute solution viscosity (D.S.V.) of 6.7.

EXAMPLE 3

An experiment similar to that in Example 1 was performed except 0.0586 gram of ferric chloride, 4.5 milliliters of aluminum triisobutyl and 4.5 milliliters of titanium tetrachloride of the same solutions were used. This corresponds to a molar ratio of Al/Ti/Fe of 10/1/2.5. A yield of 4.4% balata-like polymer was obtained which had a D.S.V. of 3.2.

EXAMPLE 4

A suspension of ferric chloride in benzene was prepared at a concentration of 0.323 molar and bottles were charged as follows: Isoprene in the amount of 30 milliliters and benzene as an inert diluent in the amount of 90 milliliters were placed in 4-ounce screw cap bottles equipped with a self-sealing rubber gasket. A 4.0 milliliter portion of 0.323 molar solution of aluminum triisobutyl and a 4.0 milliliter portion of 0.0323 molar solution of titanium tetrachloride were injected by means of a syringe into each bottle. Increments of the ferric chloride suspension made as shown above were then injected into each bottle according to the following table. The polymerization temperature was 50° C. In the following table are also shown the resulting Al/Ti/Fe ratio and the character of the polymer obtained.

Table

| Milliliters FeCl₃ | Al/Ti/Fe Molar Ratio | Polymer Character |
| --- | --- | --- |
| 2.0 | 10/1/5 | Balata-like Rubber. |
| 1.0 | 10/1/2.5 | Do. |
| 0.5 | 10/1/1.25 | Do. |

Other polyisoprenes having a 1,4 addition and a trans configuration may be prepared following the general procedures of the above examples, employing other inert diluents such as heptane and hexane, other monomer solvent ratios, and other reaction temperatures and times. Also other amounts and molar ratios of the three components in the catalyst system may be employed. In addition to the aluminum triisobutyl utilized in the above examples other aluminum alkyls such as aluminum triethyl, triheptyl, trihexyl, tributyl and the like may also be used. The selection of catalyst, amounts of catalyst, solvent ratio and reaction conditions will have an effect upon the yield and molecular weight of product. However, the desired product, 1,4 addition trans configuration polyisoprene is consistently obtained by following the teachings set forth herein.

The 1,4 addition trans configuration polyisoprene prepared by the practice of this invention, since it has the same structure as natural balata, can be used in any application that natural balata is used—namely that of golf ball covers or any other product requiring high abrasion and impact resistance.

While certain representative embodiments and details have been shown for the purpose of illustrating the invention, it will be apparent to those skilled in this art that various changes and modifications may be made therein without departing from the spirit or scope of the invention.

I claim:

1. The method of preparing polyisoprene having a polymer structure of 1,4 addition and trans configuration which comprises polymerizing isoprene in the presence of a catalyst comprising an aluminum alkyl, titanium tetrachloride and ferric chloride in which the molar ratio of aluminum alkyl/titanium tetrachloride/ferric chloride is 10/1/1–7.

2. A method according to claim 1 in which the aluminum alkyl is aluminum triisobutyl.

3. A method of preparing polyisoprene having a polymer structure of 1,4 addition and trans configuration which comprises polymerizing isoprene in the presence of a catalyst comprising 1.9 grams of aluminum triisobutyl, 0.18 gram of titanium tetrachloride and 0.77 gram of ferric chloride per 100 grams of monomeric isoprene, said aluminum triisobutyl, titanium tetrachloride and ferric chloride being present in a molar ratio of 10/1/5 respectively.

4. The method of preparing polyisoprene having a polymer structure of 1,4 addition and trans configuration which comprises polymerizing isoprene dissolved in an inert diluent in the presence of a catalyst comprising an aluminum alkyl, titanium tetrachloride and ferric chloride in which the molar ratio of aluminum alkyl/titanium tetrachloride/ferric chloride is 10/1/1–7.

5. The method of preparing polyisoprene having a polymer structure of 1,4 addition and trans configuration which comprises polymerizing isoprene in the presence of a catalyst comprising an aluminum alkyl, titanium tetrachloride and ferric chloride in which the molar ratio of aluminum alkyl/titanium tetrachloride/ferric chloride is 10/1/5.

6. The method of preparing polyisoprene having a polymer structure of 1,4 addition and trans configuration which comprises polymerizing isoprene in the presence of a catalyst comprising an aluminum alkyl, titanium tetrachloride and ferric chloride in which the molar ratio of aluminum alkyl/titanium tetrachloride/ferric chloride is 10/1/1.6.

7. The method of preparing polyisoprene having a polymer structure of 1,4 addition and trans configuration which comprises polymerizing isoprene in the presence of a catalyst comprising an aluminum alkyl, titanium tetrachloride and ferric chloride in which the molar ratio of aluminum alkyl/titanium tetrachloride/ferric chloride is 10/1/2.5.

8. The method of preparing polyisoprene having a polymer structure of 1,4 addition and trans configuration which comprises polymerizing isoprene in the presence of a catalyst comprising an aluminum alkyl, titanium tetrachloride and ferric chloride in which the molar ratio of aluminum alkyl/titanium tetrachloride/ferric chloride is 10/1/1.25.

References Cited in the file of this patent

UNITED STATES PATENTS 2,832,759　　Nowlin et al. _____ Apr. 29, 1958

FOREIGN PATENTS 534,792　　Belgium _____ Jan. 31, 1955
1,139,418　　France _____ Feb. 11, 1957

OTHER REFERENCES

Friedlander et al.: Ind. Eng. Chem. 49, 1885 (1957), November 1957 (5 pp. spec., pp. 1885–1890).